Nov. 14, 1961  H. T. JENSEN  3,008,525
ROTOR BLADE INSTALLATION MEANS AND METHOD
Filed July 25, 1957
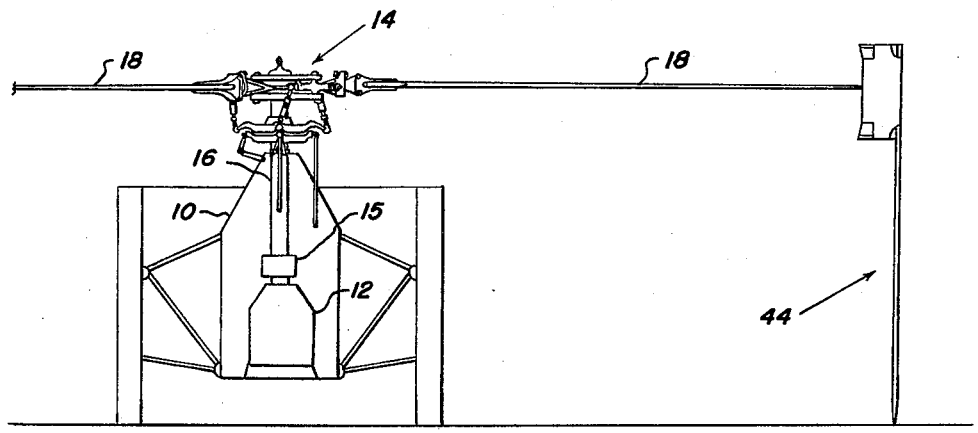
Fig. 1
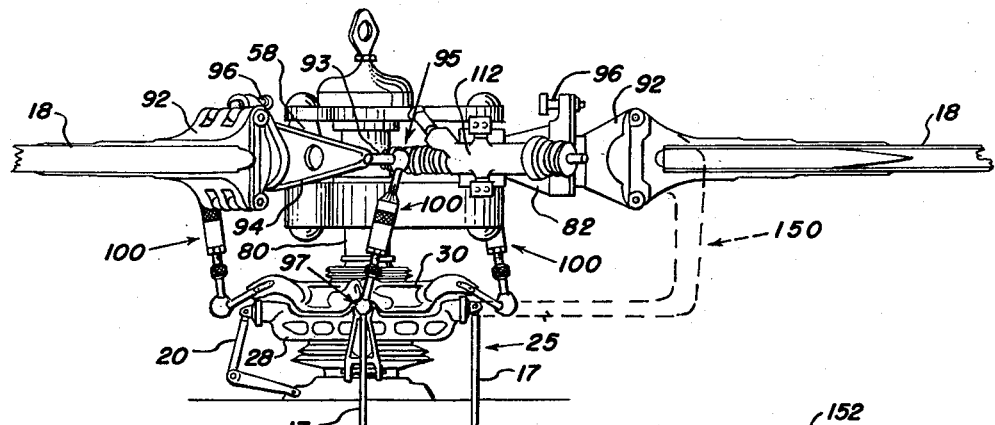
Fig. 2
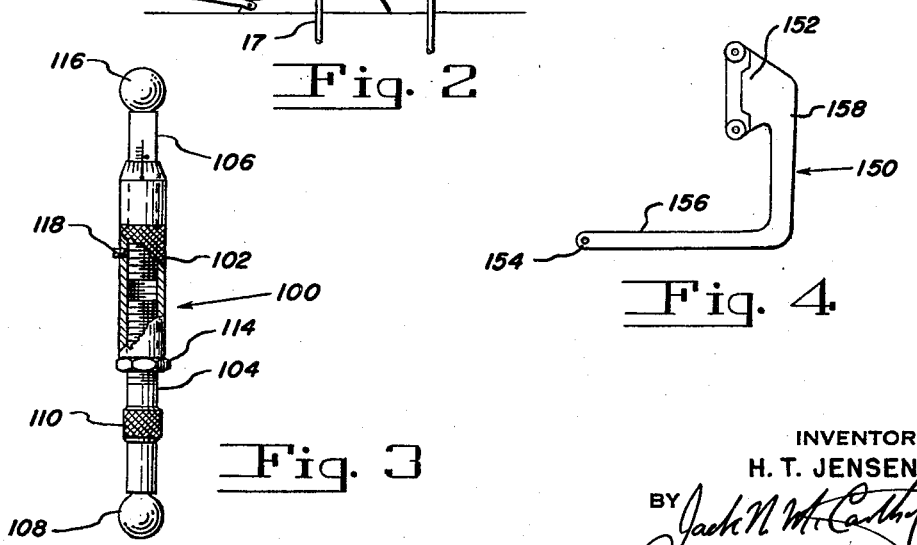
Fig. 3
Fig. 4
INVENTOR
H. T. JENSEN
BY
AGENT

United States Patent Office 3,008,525
Patented Nov. 14, 1961

3,008,525
ROTOR BLADE INSTALLATION MEANS AND METHOD
Harry T. Jensen, Milford, Conn., assignor to United Aircraft Corporation, East Hartford, Conn., a corporation of Delaware
Filed July 25, 1957, Ser. No. 674,075
16 Claims. (Cl. 170—160.22)

This invention relates generally to direct lift aircraft having a supporting rotor or rotors which may be power driven, and more particularly to a means and method for the elimination of main rotor blade tracking of the type including measuring blade tip path on an aircraft after the blades have been installed.

An object of this invention is to provide a device which will permit main rotor blades to be installed on a rotary wing aircraft in such a position so as to eliminate the requirement for blade tracking.

Another object of this invention is to provide an adjustable calibrated push-pull or connecting rod in the pitch control linkage to each helicopter blade.

A further object of this invention is to provide a micrometer or other measuring means in each push-pull rod to each blade on the test stand and on the aircraft so as to be able to adjust the length of each rod and indicate its length as compared to a reference.

Another object of this invention is to provide measuring means for each blade on the test stand and on the aircraft so as to be able to adjust the pitch of each blade and indicate the pitch angle of the blade taken to a reference plane.

A further object of this invention is to provide measuring means for each blade on the test stand and on the aircraft so as to be able to adjust the length of each rod thereby changing the pitch of each blade and indicate the pitch angle of the blade to a reference plane.

Another object of this invention is to provide a device which will permit interchangeability between production blades on a helicopter without requiring blade tracking on the helicopter.

A further object of this invention is to provide means for recording on a given blade the reading of the actuating rod micrometer which indicates the departure of the blade being measured from a given reference.

Another object of this invention is to provide a method for obtaining the proper length for each connecting rod on a given aircraft so that the individual blade pitch settings are correct to give the proper track.

Other objects and advantages will be apparent from the specification and claims and from the accompanying drawings which illustrate an embodiment of the invention.

In the drawings:

FIG. 1 is a view showing a test stand having a rotor provided with the invention for showing the position of the tip of one blade being measured with respect to a given point.

FIG. 2 is a side view of a rotor head linkage including both the collective and the cyclic pitch control and showing the adjustable calibrated actuating rods.

FIG. 3 is an enlarged view of the adjustable calibrated actuating rod.

FIG. 4 is a view of the alignment tool used on a production craft to properly adjust the calibrated actuating rods.

In helicopters and other rotary wing aircraft, it is important that the several blades rotate within a cone of revolution, and that each blade follows substantially a path on the surface of this cone. In the event that one or more blades ride above or below this cone, a cyclic vibration will occur which will vibrate the rotor shaft and transmit vibrations to the control mechanism and to the craft. For this reason, it is desirable that one blade follow as closely as possible exactly the same path as another.

The test stand, shown in FIG. 1, comprises a main unit 10 containing an engine 12 driving a rotor 14 through a transmission 15 and shaft 16. This portion of the test stand can be similar to that used to power a helicopter.

The rotor 14, as shown in FIGS. 1 and 2, is set forth more in detail in United States Patent No. 2,638,994 to M. D. Buivid. This rotor has blades 18 attached thereto each by a flapping link 82 on which a blade attaching sleeve 92 is journalled for rotation to vary the pitch of each of the blades. Inboard of the blade attaching sleeve 92 a blade pitch changing horn 94 is journalled. Each sleeve 92 is fixed relative to its cooperating horn 94 by a slidable locking pin 96. Each flapping link 82 is mounted for rotation about a drag hinge 58 to provide for lag and lead movements of each blade. A damper 112 is provided to permit proper movement of the blade around this axis.

Each blade pitch changing horn 94 has an extension 93 extending therefrom. Control of each blade pitch is obtained in a usual manner through a push-pull or connecting rod 100 which is connected at one end by a universal joint 95 to a free end of each extension 93 and connected at its other end by a universal joint 97 to an arm extending from a rotatable swash plate member 30. Each universal joint is shown in a rubber casing or cover. A stationary swash plate 28 is mounted below the rotating swash plate 30 in the usual manner to provide for actuation of said rotating swash plate. Stationary swash plate 28 is fixed against rotation in relation to said aircraft by a scissors 20.

Total pitch or collective pitch change is obtained by a movement of the swash plates 28, 30 in an axial direction along the rotor shaft 80. Cyclic pitch is obtained by a tilting of the swash plates 28, 30. This axial or tilting movement of the swash plates to obtain collective or cyclic pitch control is transmitted to the swash plates from usual control devices through connecting rods 17. One control linkage for properly positioning the swash plates to obtain a desired helicopter control is shown in United States Patent No. 2,599,690 to M. D. Buivid et al.

Each push-pull or connecting rod 100 for a helicopter has two adjustments for length. The rod 100 comprises a central cylindrical member 102 internally threaded throughout its entire length with a rod 104 threadably positioned in one end and a rod 106 threadably positioned in the other end. Rod 104 has a universal ball member 108 provided on its free end for engagement with an arm extending from a swash plate member 30 and a knurled portion 110 with which to manually rotate said rod in the member 102. Lock nut 114 is provided between rod 104 and member 102 to fixedly position said rod in relation to cylindrical member 102.

Rod 106 has a universal ball member 116 provided on its free end for engagement with its cooperating extension 93. A locking screw 118 is provided in cylindrical member 102 to fixedly position rod 106 with respect to said member. Rod 106 and the cooperating end of cylindrical member 102 have indicating or measuring means affixed thereon which indicate the position of rod 106 with respect to said cylindrical member 102. This indicating means can consist of a conventional micrometer scale.

While the push-pull or connecting rod 100 on a test stand may be similarly constructed, in view of the accuracy with which a test stand is constructed, a push-pull or connecting rod 100 may be used having only the adjustment in length which provides a means for recording the change in length of the rod.

To properly position the blade attaching sleeves on a helicopter so that balanced blades may be properly installed, a sleeve aligning tool 150 is provided. This tool is shown in full in FIG. 4 and is shown in phantom in FIG. 2 as it would be positioned on a rotor head to properly align a blade attaching sleeve. This tool comprises a blade cuff 152 constructed so as to engage the blade engaging portion of the blade attaching sleeve 92 of the rotor head and a stationary swash plate engaging means 154 for attachment to one of the arms extending from the stationary swash plate 28. The cuff member 152 and swash plate attaching member 154 are connected by arms 156 and 158 so as to properly position said cuff in relation to the swash plate attaching member. These arms may be made adjustable to make said tool adaptable to different types of rotor heads.

In a test stand installation this alignment tool 150 can be used to check the relation of the blade cuffs of the rotor head to the position of the push-pull or connecting rod 100. At the beginning of a blade balancing procedure on a test stand, all of the push-pull rods 100 should be positioned at a zero micrometer or indicating position and the blade cuffs should all be positioned at the same cuff angle. It can be seen that in the accuracy maintained in a test stand that once the blade cuffs have been set at a predetermined angle with relation to a zero setting on the push-pull rods 100 that this relationship will be maintained through normal use of the test stand. Here it can be seen that the "zero" setting of the push-pull rods indicates an angle setting. This precludes the use of the aligning tool and push-pull rods having two adjustments each time a set of blades is to be balanced on the test stand.

The tracking device 44, shown in FIG. 1, is a blade tip indicating device which is used for tracking and is more fully described in United States Patent No. 2,552,739 to Reon B. Roberts for Method of Tracking Rotor Blades.

*Operation*

In preparing production blades for use on helicopters in which the subject invention is utilized to permit interchangeability, the following procedure is used: (1) Production blades are mounted in position on a test stand having the blade attaching cuffs set at like angles and each with an actuating rod having a micrometer or other calibrated means for adjusting its length set at a "zero" position. (2) The test stand is placed in operation rotating the blades to be balanced while the blade pitch control linkage is held at a predetermined position. (3) The blades are then balanced dynamically and aerodynamically with a master blade or reference always keeping the blades in track such as by the method shown in the United States Patent No. 2,759,359 to H. T. Jensen et al., the push-pull rods for the blades being balanced requiring adjustment throughout this procedure. (4) The reading on each indicating or measuring means, which indicates the variance in length of the push-pull rod of each blade being tested from its "zero" position which is a measurement of blade angle, is marked on the attached blade. This departure may be marked by stenciling, stamping or by any other satisfactory means. These blades may then be taken off the test stand and stored or properly set aside until their use is desired on an aircraft. Another set of blades can then be placed on the test stand and balanced in the same manner to the same master blade or reference. These blades can then be stored with the first set and will be interchangeable in use with them. Any number of production blades can be balanced by this method.

In placing a tracked production blade which has been balanced on the test stand by this method into position on a helicopter, each blade cuff angle of the helicopter rotor is set at a like angle with the push-pull rods at a "zero" position. This may be done by removing a rod 17 and attaching a sleeve aligning tool 150 to the stationary swash plate 28 by its means 154. The rotor is then rotated until one blade attaching sleeve 92 is over the tool 150. The tool is then swung up so that the blade cuff 152 can engage the blade cuff receiving end of the sleeve 92. If the sleeve is at the proper angle, the blade cuff 152 will engage the blade cuff receiving end of the sleeve 92. The rotor is rotated and this procedure is repeated for each sleeve until all of the sleeves have been properly set. With the sleeves all at the proper angle, all of the push-pull rods should be positioned so that the indicating or measuring means is set on "zero." If a blade sleeve is not at the proper angle, the length of the push-pull rod is adjusted by the rod 104 until the desired angle is obtained. This permits the rod to remain at a "zero" indicating position.

In the above, each push-pull rod 100 indicates a "zero" position as the sleeve aligning tool 150 is removed from engagement with the blade cuff receiving end of the sleeve 92.

In preparing a set of blades for use in a particular helicopter, the blades may be placed on a test stand set up as indicated in step 1 above and then placed in operation as in step 2. The blades, however, may be balanced dynamically and aerodynamically with reference to one of the blades to be used always keeping the blades in track by a method such as described in the patent to Jensen set forth above in step 3. Step 4, as set forth above, may then be performed. These blades may then be taken off the test stand and are ready for installation on the helicopter in the same manner as the balanced blades above, that is, by first setting each blade cuff angle of the helicopter rotor at a like angle with the push-pull rods at a "zero" position.

As each blade is positioned on a rotor to provide for proper tracking, the length of its actuating rod is adjusted by rod 106 to include the variation or departure from "zero" marked on the blade. After the indicating means is set properly at the indicated number, the actuating rod is locked in this position. When this has been properly done for each blade on the helicopter, the need for tracking of the blades on the helicopter is eliminated because all of the blades on the helicopter will be in track in the same degree to which they were brought to track on the test stand.

While one embodiment of the invention has been shown and described herein, it will be evident that various changes may be made in the construction and arrangement of the parts without departing from the scope of the invention.

I claim:

1. In a rotary wing aircraft, a rotor, said rotor having blade attaching sleeves thereon, each blade attaching sleeve being rotatably mounted about a pitch changing axis, means for individually changing the angular position of each sleeve, and means for measuring each change in angular position of each sleeve by said means for individually changing the angular position of each sleeve.

2. In a rotary wing aircraft, a rotor, said rotor having blade attaching sleeves thereon, each blade attaching sleeve being rotatably mounted about a pitch changing axis, a connecting rod connected to each sleeve for changing its angular position, each connecting rod having means for individually changing the angular position of its cooperating sleeve, each rod having means for measuring the angular change of its cooperating sleeve made by the means on each connecting rod for individually changing the angular position of its sleeve, and locking means for locking each measuring means at a predetermined setting.

3. In a rotary wing aircraft, a rotor, said rotor having blade attaching sleeves thereon, each blade attaching sleeve being rotatably mounted about a pitch changing axis, a connecting rod connected to each sleeve for individually changing its angular position, means for measuring the angular change of each sleeve, and means for changing the length of each connecting rod without actuating the measuring means.

4. In a rotary wing aircraft, a rotor, said rotor having blade attaching sleeves thereon, each blade attaching sleeve being rotatably mounted about a pitch changing axis, means for controlling rotative movement of each sleeve about its axis, said means having a connecting rod for each sleeve, means for changing the length of each of said rods, movement of each means for changing the length of each of said rods individually changing the angular position of each sleeve with relation to said other sleeves, and means for measuring the angular change made by said means for individually changing the angular position of each sleeve.

5. In a rotary wing aircraft, a rotor blade having a pitch changing axis, a rotatable hub and means thereon for mounting said rotor blade for movement about its pitch changing axis, a connecting rod connected to said blade for moving said blade about its pitch changing axis, said rotor blade being marked to indicate the variation of the length of said connecting rod from a predetermined standard, said connecting rod being adjustable so that its length can be varied to a length including said variation, indicating means for permitting said connecting rod to be accurately positioned, and means for locking said connecting rod in a fixed position.

6. In a rotary wing aircraft, a rotor blade having a pitch changing axis, a rotatable hub and means thereon for mounting said rotor blade for movement about its pitch changing axis, a connecting rod connected to said blade for moving said blade about its pitch changing axis, said rotor blade varying from a preselected standard, marking means indicating the variation of said blade from a preselected standard, said connecting rod being adjustable to position said blade to cause it to track in a predetermined path, said marking means also indicating the adjustment of said rod necessary to cause said blade to track in a predetermined path, a calibrated device for accurately positioning said connecting rod in accordance with said marking means, and means for locking said connecting rod in a fixed position.

7. In a rotary wing aircraft, a plurality of rotor blades each having a pitch changing axis, a rotatable hub and means thereon for mounting each rotor blade for movement about its pitch changing axis, a connecting rod connected to each blade for moving said blade about its pitch changing axis, each rotor blade varying from a preselected standard, marking means on each blade indicating the variation of said blade from a preseletced standard, each connecting rod being adjustable in length to position its respective blade to cause it to track in a predetermined path, said marking means also indicating the adjustment of each rod necessary to cause its blade to track in a predetermined path, each connecting rod having two relatively movable sections, one section of each connecting rod having graduations marked thereon for accurately positioning the other cooperating section for setting the connecting rod in accordance with said marking means, means for locking each connecting rod in a fixed position.

8. The method of mounting a balanced blade whose difference in angular position after balancing as compared to a reference is known on a blade attaching sleeve of a rotary wing aircraft, which consists of positioning a blade attaching sleeve at a predetermined fixed angular setting, attaching a balanced blade to the blade attaching sleeve, repositioning the blade attaching sleeve at an angular setting including the difference in angular position of the blade as compared to a reference.

9. The method of mounting blades having a connecting rod on a rotary wing aircraft comprising the steps of, rotating a blade to be balanced and a reference blade together while both blades are held at a predetermined pitch angle, adjusting said blade to be balanced until it is balanced and tracks with said reference blade, measuring the difference between the length of the connecting rod of the balanced blade and the length of the connecting rod of the reference blade, mounting a blade so balanced on a rotary wing aircraft, adjusting the length of the connecting rod to include the difference between the length of the connecting rod of the balanced blade and the length of the connecting rod of the reference blade.

10. The method of mounting blades having a connecting rod on a rotary wing aircraft comprising the steps of, rotating a blade to be balanced and a reference blade together while both blades are held at a predetermined pitch angle, adjusting said blade to be balanced until it is balanced and tracks with said reference blade, measuring the difference between the pitch angle of the balanced blade and the pitch angle of the reference blade, mounting a blade so balanced on a rotary wing aircraft, adjusting the length of the connecting rod to include the difference between the pitch angle of the balanced blade and the pitch angle of the reference blade.

11. A blade sleeve aligning tool for rotary wing aircraft comprising a member shaped as a blade cuff, arm means extending from said member, and means for pivotally attaching the free end of said arm means to a rotary wing aircraft.

12. A blade sleeve aligning tool for rotary wing aircraft having a nonrotatable swash plate in its control system comprising a member shaped as a blade cuff, arm means extending from said member, and means for pivotally attaching the free end of said arm means to the nonrotatable swash plate of the rotary wing aircraft.

13. In combination, a rotor, said rotor having blade attaching sleeves thereon rotatably mounted, means for controlling movement of said sleeves about their axes, said means having a connecting rod connected to each sleeve, means for changing the length of each of said rods, means for changing the angular position of each sleeve with relation to said rotor a predetermined amount, said controlling means having a nonrotatable switch plate, a blade sleeve aligning member pivotally attached to said nonrotatable swash plate, said member having a member shaped as a blade cuff for engagement with a blade attaching sleeve, said blade cuff engaging said blade attaching sleeve when said sleeve has been properly positioned.

14. In a rotary wing aircraft, a rotor, said rotor having blade attaching sleeves rotatably mounted thereon for movement about their pitch changing axes, control means for controlling rotative movement of said sleeves about their axes, said control means including a separate connecting rod connected to each sleeve, adjustable means for changing the length of each of said rods with respect to said rotor, and means for measuring the angular change of each sleeve caused by a change in length of its connecting rod.

15. In a rotary wing aircraft, a rotor, said rotor having a blade attaching sleeve thereon each rotatably mounted about a pitch changing axis, a connecting rod connected to each sleeve for changing its angular position, first means for changing the length of each connecting rod, said first means having means for measuring the change in length of each connecting rod, and second means for changing the length of each connecting rod without actuating the measuring means.

16. In a rotary wing aircraft, a rotor blade having a pitch changing axis, a rotatable hub and means thereon for mounting said rotor blade for movement about its pitch changing axis, a connecting rod connected to said blade for moving said blade about its pitch changing axis, said rotor blade varying from a preselected standard in the amount of lift it will generate at a given pitch setting, said connecting rod being adjustable to position said blade to cause it to track in a predetermined path, marking means indicating the adjustment of said rod necessary to cause said blade to track in a predetermined path and equate its lift with a preselected standard, a calibrated device for indicating the positioning of said connecting rod in accordance with said marking means, and means for locking said connecting rod in a fixed position.

References Cited in the file of this patent

UNITED STATES PATENTS

| | | | |
|---|---|---|---|
| 2,323,614 | MacDonald | July 6, | 1943 |
| 2,364,230 | McKanna | Dec. 5, | 1944 |
| 2,410,963 | Chappedelaine | Nov. 12, | 1946 |
| 2,552,739 | Roberts | May 15, | 1951 |
| 2,652,898 | Renoux | Sept. 22, | 1953 |
| 2,669,120 | Jensen | Feb. 16, | 1954 |
| 2,759,359 | Jensen | Aug. 21, | 1956 |